United States Patent Office 3,080,388
Patented Mar. 5, 1963

3,080,388
SYNTHESIS OF STEROIDS OF THE 12-ALKYLIDENEPREGNENE
Gordon H. Thomas, Birmingham, England, and Josef Fried, Princeton, N.J., assignors to Olin Mathieson Chemical Corporation, New York, N.Y., a corporation of Virginia
No Drawing. Filed Oct. 19, 1959, Ser. No. 847,044
13 Claims. (Cl. 260—397.3)

This application is a continuation-in-part of our U.S. application No. 711,780, filed January 29, 1958, and now abandoned.

This invention relates to the synthesis of steroids and has for its object the provision of new steroids of the general formula

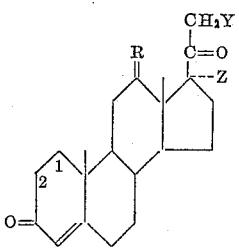

wherein the 1,2-position is saturated or double-bonded, R is lower alkylidene (preferably methylene), Y is hydrogen, hydroxy or acyloxy, and Z is hydrogen or hydroxy; a process for preparing these steroids; and new intermediates useful in said preparation.

The new 12-alkylidene steroids of this invention are prepared by interacting (A) one of the following: 12α-(lower alkyl)-11α-hydroxyprogesterone; 12α-(lower alkyl)-$\Delta^{1,4}$-pregnadiene-11α-ol-3,20-dione; 12α-(lower alkyl)-11α 17α-dihydroxy-progesterone; 12α-(lower alkyl)-$\Delta^{1,4}$-pregnadiene-11α,17α-diol-3,20-dione; or a 21-ester of one of the following steroids: 12α-(lower alkyl)-$\Delta^{4}$-pregnene-11α,21-diol-3,20-dione; 12α(lower alkyl)-$\Delta^{1,4}$-pregnadiene-11α,21-diol-3,20-dione;12α-(lower alkyl)-$\Delta^{4}$-pregnene-11α,17α,21-triol-3,20-dione; and 12α-(lower alkyl-$\Delta^{1,4}$-pregnadiene-11α,17α,21-triol-3,20-dione; with (B) a lower alkyl or monocyclic hydrocarbon aromatic sulfonyl halide, such as mesyl chloride and tosyl chloride, whereby the new intermediates of this invention are formed, namely the 11α-lower alkane (or monocyclic hydrocarbon aromatic) sulfonyloxy derivatives of the formula

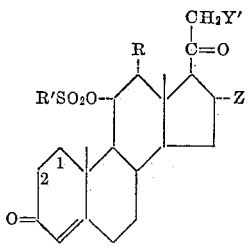

wherein the 1,2-position is saturated or double-bonded, R and Z are as hereinbefore defined, Y' is hydrogen or acyloxy, and R' is lower alkyl (preferably methyl) or monocyclic hydrocarbon aryl (preferably p-tolyl). The reaction is preferably conducted in an organic solvent in the presence of an organic base such as pyridine.

(1) The starting steroidal reactants used in the process of this invention are prepared as follows:

The starting 12α-(lower alkyl)-11α-hydroxyprogesterone and 12α-(lower alkyl)-$\Delta^{1,4}$-pregnadiene-11α-ol-3,20-dione reactants can be prepared by diketalizing 9α-fluoro-11-ketoprogesterone or 9α-fluoro-$\Delta^{1,4}$-pregnadiene-3,11,20-trione in the usual manner by treating with ethylene glycol in the presence of an acid catalyst, and interacting the 3,20-diketal of 9α-fluoro-11-ketoprogesterone or the 3,20-diketal of 9α-fluoro-$\Delta^{1,4}$-pregnadiene-3,11,20-trione thus formed with lithium lower alkyl (e.g., lithium methyl), thereby yielding the 3,20-diketal of 12α-lower alkyl (e.g., methyl)-11-ketoprogesterone or the 3,20-diketal of 12α-lower alkyl (e.g. methyl)-$\Delta^{1,4}$-pregnadiene-3,11,20-trione, respectively. The resulting diketals are reduced by means of a reducing agent, such as lithium metal in liquid ammonia, to yield the 3,20-diketal of 12α-lower alkyl-11α-hydroxyprogesterone or the 3,20-diketal of (12α-lower alkyl-$\Delta^{1,4}$-pregnadiene-11α-ol-3,20-dione, respectively, and then hydrolyzed in the usual manner, as by treatment with a dilute aqueous acid at an elevated temperature, to the desired 12α-lower alkyl-11α-hydroxy-progesterone or the 12α-lower alkyl-$\Delta^{1,4}$-pregnadiene-11α-ol-3,20-dione respectively. These starting materials are active progestational agents which can be administered in lieu of progesterone in the treatment of habitual abortions.

The following examples illustrate the preparation of these starting materials:

EXAMPLE A (1) *Preparation of 9α-Fluoro-11-Ketoprogesterone 3,20-Bis-Ethylene Ketal*

A mixture of 10 g. of 9α-fluoro-11-ketoprogesterone, 350 ml. of benzene, 80 ml. of ethylene glycol and 200 mg. of para-toluene-sulfonic acid monohydrate is refluxed with stirring for 72 hours. The reaction mixture is then cooled to room temperature and neutralized with sodium bicarbonate solution. The phases are separated and the aqueous layer reextracted with additional amounts of benzene. The combined benzene extracts are washed with water, dried over sodium sulfate and evaporated to dryness in vacuo. The crude residue on crystallization from acetone-hexane yields about 11 g. of the essentially pure bis-ethylene ketal melting at about 179–182°. Recrystallization of this material from methanol gives an analytical sample of the following properties: M.P. about 180–190°; $[\alpha]_D^{23}$ −25°.

*Analysis.*—Calc'd for $C_{25}H_{35}O_5F$ (434.53): C, 69.10; H, 8.12. Found: C, 69.19; H, 8.18.

(2) *Preparation of 12α-Methyl-11-Ketoprogesterone 3,20-Bis-Ethylene Ketal*

A solution of 9α-fluoro-11-ketoprogesterone 3,20-bis-ethylene ketal (10 g.) in benzene (100 ml.) is treated with an ethereal solution of lithium methyl (150 ml., 13.5 mg. of lithium metal/ml. The solution is stirred for 4 hours at room temperature and then the excess lithium methyl is decomposed by the addition of ice. Chloroform (300 ml.) is added, and the mixture is washed several times with water, dried over sodium sulfate and evaporated in vacuo. Trituration of the residue with hexane gives about 4.2 g. of 12α-methyl-11-ketoprogesterone 3,20-bis-ethylene ketal, M.P. about 135–138°. A second crop of crystals (about 2.4 g., M.P. about 124–130°) is obtained on concentrating the hexane mother liquor. Crystallization from methanol gives an analytical sample melting at about 139–142°, $[\alpha]_D$ −8.8° (c. 0.716 in CHCl₃);

$$\lambda_{max.}^{Nujol} 5.87\mu$$

*Analysis.*—Calc'd for $C_{26}H_{38}O_5$ (430.56): C, 72.50; H, 8.90. Found: C, 72.71; H, 8.90.

Similarly, by substituting an equivalent amount of lithium ethyl for the lithium methyl in the procedure of Example A2, 12α - ethyl - 11 - ketoprogesterone 3,20-bis-ethylene ketal is obtained. Furthermore, any diketal may be substituted for the 3,20-bis-ethylene ketal in the procedures of Example A1, thereby yielding the corresponding 3,20-diketal derivative.

(3) Preparation of 12α-Methyl-11α-Hydroxyprogesterone 3,20-Bis-Ethylene Ketal To a stirred solution of 12α-methyl-11-ketoprogesterone 3,20-bis-ethylene ketal (640 mg.) in 100 ml. of liquid ammonia and 20 ml. of methanol, is added 500 mg. of lithium in small pieces over 15 minutes. The liquid ammonia is allowed to evaporate at room temperature and the residue is diluted with 50 ml. of water. The precipitated solid (about 620 mg., M.P. about 193–207°) is collected, washed well with water and dried. Crystallization from methanol gives an analytical sample of the 11α-hydroxy compound which melts at about 211–213° C; $[\alpha]_D$—28.5° (c. 1.13 in $CHCl_3$).

Similarly, by substituting 1 g. of 12α-ethyl-11-keto progesterone 3,20-bis-ethylene ketal for the 12α-methyl-11-keto-progesterone 3,20-bis-ethylene ketal in the procedure of Example A3, 12α-ethyl-11α-hydroxyprogesterone 3,20-bis-ethylene-ketal is obtained.

(4) Preparation of 12α-Methyl-11α-Hydroxyprogesterone

A solution of 193 mg. of 12α-methyl-11α-hydroxyprogesterone 3,20-bis-ethylene ketal in 5 ml. of methanol and 1 ml. of 8% sulfuric acid is heated under reflux for one hour. Dilution with water gives about 147 mg. of 12α-methyl-11α-hydroxyprogesterone which melts at about 207–211°. Crystallization from methanol yields a pure sample having melting point 215–218°; $[\alpha]_D+155°$ (c. 1.02 in $CHCl_3$);

$\lambda_{max.}^{Etoh}$ 241 mμ (15,700); $\lambda_{max.}^{Nujol}$ 2.95, 5.92, 5.99, 6.22

*Analysis.*—Calc'd for $C_{22}H_{32}O_3$ (344.48): C, 76.70; H, 9.36. Found: C, 76.50; H, 9.23.

Similarly, 12α-ethyl-11α-hydroxyprogesterone 3,20-bis-ethylene ketal can be hydrolyzed to 12α-ethyl-11α-hydroxyprogesterone.

EXAMPLE B

*12α-Methyl-Δ$^{1,4}$-Pregnadiene-11α-Ol-3,20-Dione*

By substituting an equal amount of 9α-fluoro-Δ$^{1,4}$-pregnadiene-3,11,20-trione for the 9α-fluoro - 11 - ketoprogesterone in the process of Example A1 and following the procedure of the remaining steps of the example, 12α-methyl-Δ$^{1,4}$-pregnadiene-11α - ol - 3,20-dione is obtained. Furthermore, if lithium ethyl is substituted for lithium methyl in the thus modified process of Example A2, 12α-ethyl-Δ$^{1,4}$-pregnadiene-11α-ol-3,20-dione is ultimately obtained.

(2) The starting 21-esters of 12α-(lower alkyl)-Δ$^4$-pregnene-11α,21-diol-3,20-dione and 12α-(lower alkyl)-Δ$^{1,4}$-pregnadiene-11α,21-diol-3,20-dione are prepared by: (a) reducing, with a reducing agent such as lithium aluminum hydride, the 3,20-diketal of 12α-(lower alkyl)-11-ketoprogesterone and the 3,20-diketal of 12α-(lower alkyl)-Δ$^{1,4}$-pregnadiene-3,11,20-trione, respectively to obtain the corresponding 11β-hydroxy-derivatives; (b) treating the 11β-hydroxy derivative with a diester of oxalic acid (e.g., a lower alkyl ester such as ethyl oxalate) in the presence of approximately one equivalent of an alkali metal alkoxide (e.g., sodium methoxide), whereby the alkali metal enolate of the ester of 21-hydroxyoxalyl-12α-(lower alkyl)-11β-hydroxyprogesterone and 21-hydroxyoxalkyl-12α-(lower alkyl) - Δ$^{1,4}$-pregnadiene-11β-ol-3,20-dione are formed; (c) interacting the alkali metal enolate ester with a base, such as an alkali metal hydroxide, to yield a 21-oxalyl-12α-(lower alkyl)-11β-hydroxyprogesterone and 21-oxalyl-12α-(lower alkyl)-Δ$^{1,4}$-pregnadiene-11β-ol-3,20-dione, respectively; (d) treating the oxalyl compounds thus formed with iodine in a basic medium to yield 21-iodo-12α-(lower alkyl)-11β-hydroxy-progesterone and 21-iodo-12α-(lower alkyl)-Δ$^{1,4}$-pregnadiene-11β-ol-3,20-dione, respectively; (e) converting the 21-iodo group to a 21-acyloxy group by treatment with the desired acid salt (preferably in the presence of the free acid), thereby yielding a 21-ester of 12α-(lower alkyl)-corticosterone and 12α-(lower alkyl)-Δ$^{1,4}$-pregnadiene-11β, 21-diol-3,20-dione, respectively, (f) oxidizing the 21-ester of 12α-(lower alkyl)-corticosterone (or the 1,2-unsaturated thereof) with an oxidizing agent such as chromium trioxide; (g) hydrolyzing the 11-keto analog thus prepared with a base such as potassium carbonate; (h) ketalizing the 12α-(lower alkyl)-11-dehydrocorticosterone (or the 1,2 - unsaturate thereof), thus obtained, with ethylene glycol; (i) reducing the 3,20-bis-ethylene ketal with a reducing agent such as lithium in ammonia; and (j) deketalizing the thus obtained 12α-(lower alkyl)-11α-hydroxy compounds with a hydrolyzing agent such as a dilute aqueous acid to obtain 12α-(lower alkyl)-Δ$^4$-pregnene-11α,21-diol-3,20-dione or the 1,2-unsaturated thereof. These starting materials are mineralo corticoids which are physiologically active and can be used in place of such known substances as desoxycorticosterone.

The following examples illustrate the preparation of these starting materials:

EXAMPLE C

*12α-Methyl-Corticosterone 21-Acetate*

(1) *Preparation of 12α - methyl - 11β - hydroxyprogesterone 3,20-bis-ethylene ketal.*—A solution of 1 g. of 12α-methyl-11-ketoprogesterone 3,20-bis-ethylene ketal in 50 ml. of dry tetrahydrofuran is heated under reflux with 1 g. of lithium aluminum hydride for 18 hours. Ice is added to the cooled solution to decompose excess reagent and then a saturated aqueous solution of sodium sulfate is added with stirring until the precipitated aluminum salts are formed into a slurry. The clear ether solution is decanted off and the inorganic material is washed twice with chloroform. The combined organic extracts are dried over sodium sulfate and then evaporated in vacuo. The residue is dissolved in 10 ml. benzene and absorbed on a column of 30 g. of alumina. Elution with benzene (900 ml.) and chloroform-benzene (1:9, 500 ml.), followed by crystallization from acetone-hexane, yields 12α-methyl-11β-hydroxyprogesterone 3,20-bis-ethylene ketal (about 660 mg.) melting at about 169–175°. Crystallization from acetone-hexane affords an analytical sample which melts at about 177–179°; $[\alpha]_D$—11.5° (c. 1.24 in $CHCl_3$);

$\lambda_{max.}^{Nujol}$ 2.8μ

*Analysis.*—Calc'd for $C_{26}H_{40}O_5$ (432.58): C, 72.19; H, 9.32. Found: C, 72.30; H, 9.20.

(2) *Preparation of 12α-methyl - 11β - hydroxyprogesterone.*—A solution of 1.4 g. of 12α-methyl-11β-hydroxyprogesterone 3,20-bis-ethylene ketal in 30 ml. of methanol and 3 ml. of 8% sulfuric acid is heated under reflux for one hour. The mixture is diluted with water, the precipitated solid collected and crystallized from chloroform-methanol to give about 1.1 g. of 12α-methyl-11β-hydroxyprogesterone, M.P. about 235–238°. Crystallization from chloroform-methanol gives an analytical sample melting at about 238–240°, $[\alpha]_D+199°$ (c. 1.08 in $CHCl_3$);

$\lambda_{max.}^{Etoh}$ 241 mμ (16,600); $\lambda_{max.}^{Nujol}$ 2.9, 5.91 (inflection); 5.95, 6.14

*Analysis.*—Calc'd for $C_{22}H_{32}O_3$ (344.48): C, 76.70; H, 9.32. Found: C, 76.59; H, 9.41.

(3) *Preparation of 21-ethoxyoxalyl - 12α - methyl-11β-hydroxyprogesterone.*—To a solution of 7.23 g. of 12α-methyl-11β-hydroxyprogesterone in 100 ml. of tertiary butyl alcohol is added at 50° 10 ml. of ethyl oxalate and 1.03 ml. of a 2 N methanolic solution of sodium methoxide. The mixture is stirred at room temperature for 3 hours during which time the sodium enolate of 21-ethoxyoxalyl-12α-methyl-11β - hydroxyprogesterone separates from solution. The material is collected, dissolved in water and the solution acidified with dilute hydrochloric acid. The precipitated 21-ethoxyoxalyl compound is collected, washed with a little dry ether and dried in vacuo.

(4) *Preparation of 21-oxalyl-12α-methyl-11β-hydroxyprogesterone.*—To a solution of 800 mg. of potassium hydroxide in 30 ml. of ethanol is added 5 g. of the sodium enolate of 21 - ethoxyoxalyl-12α-methyl-11β-hydroxyprogesterone, and the mixture is stirred at room temperature under nitrogen for 8 hours. The reaction mixture is diluted with 1.5 liters of water and then acidified with dilute hydrochloric acid. The precipitated 21-oxalyl compound is collected, washed with water and dried in vacuo.

(5) *Preparation of 21-iodo-12α-methyl-11β-hydroxyprogesterone.*—A suspension of 5 g. of 21-ethoxyoxalyl-12α-methyl-11β-hydroxyprogesterone in a solution of 1.35 g. of potassium hydroxide in 50 ml. of ethanol is stirred at room temperature for 6 hours. The mixture is poured into 3 liters of water in which has been previously dissolved 48 g. of disodium hydrogen phosphate dodecahydrate. To the resultant solution is added first, dropwise with stirring, 4 g. of iodine in 200 ml. of methanol and then 3.2 g. of potassium hydroxide dissolved in the minimum quantity of water. After allowing the solution to stand at room temperature for 16 hours, the precipitated material is collected, washed with water and dried in vacuo. Crystallization from acetone-hexane yields a pure sample of the 21-iodo compound.

(6) *Preparation of 12α-methylcorticosterone 21-acetate.*—To a solution of 200 mg. of 21-iodo-12α-methyl-11β-hydroxyprogesterone in 15 ml. of acetone is added 2 g. of potassium bicarbonate and 1.35 ml. of glacial acetic acid. The mixture is then refluxed for 18 hours. Water is added and the steroids are extracted with chloroform. The chloroform solution is washed with water, dried over sodium sulfate and evaporated to dryness in vacuo. Crystallization of the residue from acetone-hexane yields 12α-methylcorticosterone 21-acetate.

Similarly, by substituting 12α-methyl-Δ$^{1,4}$-pregnadiene-3,11,20-trione 3,20-bis-ethylene ketal for the 12α-methyl-11β-ketoprogesterone 3,20-bis-ethylene ketal in the procedure of Example C1 and following the procedures of Example C2 through 6 the corresponding 1-dehydro intermediates are formed, leading ultimately to 12α-methyl-Δ$^{1,4}$-pregnadiene-11β-21-diol-3,20-dione 21-acetate. Furthermore, by substituting other 12α-(lower alkyl)-11-ketoprogesterone 3,20-bis-ethylene ketal (e.g., 12α-ethyl-11-ketoprogesterone 3,20-bis-ethylene ketal) for the 12α-methyl steroid in Example C1 and following the procedures of Example C2 through 6, the corresponding 12α-(lower alkyl) intermediates are formed, and the corresponding 12α-(lower alkyl) corticosterone 21-acetate (e.g., 12α-ethylcorticosterone 21-acetate) are recovered as the final products. Moreover, if another acid is substituted for the glacial acetic acid in Example C6, the corresponding 21-ester is formed.

(7) *Preparation of 12α-methyl - 11 - dehydrocorticosterone 21-acetate.*—To a stirred solution of 5 g. of 12α-methylcorticosterone 21-acetate in 200 ml. of acetone is added chromium trioxide in 0.67 N sulfuric acid (200 mg./ml.) until a permanent brown coloration is obtained (about 5 ml. required). The solution is stirred at room temperature 30 minutes. Methanol is added to destroy the excess chromic acid and then the mixture is concentrated to about half its volume in vacuo. On adding water, the 11-ketone separates from solution. The material is collected, washed with water, dried and crystallized from acetone-hexane.

(8) *Preparation of 12α-methyl - 11 - dehydrocorticosterone.*—To a stirred solution of 4.3 g. of 12α-methyl-11-dehydrocorticosterone 21-acetate in 50 ml. of methanol is added under nitrogen 10.5 ml. of 10% potassium carbonate solution. After stirring for one hour, the mixture is neutralized by the addition of 1.5 ml. of glacial acetic acid. Saline solution is then added to precipitate the 12α-methyl-11-dehydrocorticosterone. The solid is collected, washed with water, dried and crystallized from acetone-hexane to give 12α-methyl-11-dehydrocorticosterone.

(9) *Preparation of 12α-methyl-Δ$^5$-pregnene-21-ol-3,11, 20-trione 3,20-bis-ethylene ketal.*—A mixture of 3 g. of 12α-methyl-11-dehydrocorticosterone, 150 ml. of benzene, 24 ml. of ethylene glycol and 48.4 mg. of p-toluene sulfonic acid monohydrate is heated under reflux for 24 hours, the water formed during the reaction being removed azeotropically in a suitable separator. The mixture is diluted with 200 ml. of chloroform and washed successively with dilute sodium bicarbonate and water. Evaporation in vacuo followed by crystallization of the residue from methanol yields 12α-methyl-Δ$^5$-pregnene-21-ol-3,11,20-trione 3,20-bis-ethylene ketal.

(10) *Preparation of 12α-methyl-Δ$^5$-pregnene-11α,21-diol-3,20-dione 3,20-bis-ethylene ketal.*—To a solution of 200 mg. of 12α-methyl-Δ$^5$-pregnene-21-ol-3,11,20-trione 3,20-bis-ethylene ketal in 8 ml. of methanol and 50 ml. of liquid ammonia is added over a ten minute period 160 mg. of finely cut lithium. The solvent is allowed to evaporate off at room temperature (about 2 hours) and the residue is triturated with water. The precipitated material is collected, washed with water and dried in vacuo. Crystallization from acetone-hexane yields 12α - methyl - Δ$^5$ - pregnene - 11α,21 - diol - 3,20 - dione 3,20-bis-ethylene ketal.

(11) *Preparation of 12α-methyl-Δ$^4$-pregnene-11α,21-diol-3,20-dione.*—A solution of 100 mg. of 12α-methyl-Δ$^5$-pregnene-11α,21-diol-3,20-dione 3,20-bis-ethylene ketal in 20 ml. of methanol and 0.8 ml. of 8% sulfuric acid is refluxed for 40 minutes. On dilution with water, 12α-methyl-Δ$^4$-pregnene-11α,21-diol-3,20-dione separates from solution. The steroid is filtered off, washed with water and dried in vacuo.

Furthermore, if 12α-methyl-Δ$^{1,4}$-pregnadiene-11β,21-diol-3,20-dione 21-acetate and 12α-ethylcorticosterone 21-acetate are substituted for the 12α-methylcorticosterone 21-acetate in the procedure of Example C7 and the procedures of Example C8 through 11 are followed, the corresponding 1-dehydro and 12α-ethyl derivatives are obtained, respectively.

(3) The starting 21-esters of 12α-(lower alkyl)-Δ$^4$-pregnene-11α,17α,21-triol-3,20-diones and 12α-(lower alkyl)-Δ$^{1,4}$-pregnadiene-11α,17α,21-triol-3,20-diones can be prepared from 12α-(lower alkyl)-11β-hydroxyprogesterones (e.g., 12α-methyl-11β-hydroxyprogesterone and 12α-ethyl-11β-hydroxyprogesterone) by the following series of reactions: (a) reacting the starting steroid with a diester of oxalic acid (e.g., a lower alkyl ester such as ethyl oxalate) in the presence of at least two equivalents of an alkali metal alkoxide (e.g., sodium methoxide) whereby the diester of 2,21-oxalyl-12α-(lower alkyl)-11β-hydroxyprogesterone, as well as its alkali metal dienolate, is formed; (b) reacting the diester with approximately three moles of bromine per mole of steroid and an alkali metal alkoxide to yield first the 2,21,21-tribromide derivative and then the alkyl ester of 2-bromo-12α - (lower alkyl) - Δ$^{4,17(20)}$ - pregnadiene - 11β - ol - 3-one-21-oic acid; (c) debrominating the latter compound, as by treatment with zinc in an acid medium, to yield the corresponding 2-debrominated derivative; (d) treating the debrominated compound with pyrrolidine to yield 3 - pyrrolidino - 12α - (lower alkyl) - Δ$^{3,5,17(20)}$ - pregnatriene-11β-ol-3-one-21-oic acid alkyl ester; (e) reducing the 21-acid, as by treatment with lithium aluminum hydride, to yield 12α-(lower alkyl)-Δ$^{4,17(20)}$-pregnadiene-11β,21-diol-3-one; (f) acylating the latter compound in the usual manner, as by treatment with the acyl halide or acid anhydride of a suitable organic carboxylic acid, to yield the 21-ester derivative; (g) reducing the 21-ester by treatment with osmium tetroxide and phenyliodosoacetate to give the 21-esters of 12α-(lower alkyl) hydrocortisones; (h) oxidizing the 21-esters with an oxidizing agent (e.g., chromium trioxide) to yield 21-esters of 12α-(lower alkyl)cortisones; (i) hydrolyzing the 12-keto compound with a base such as potassium carbonate; (j) ketalizing the 12-keto analog, thus obtained, with ethylene glycol; (k) reducing, as by treatment with an alkali metal (e.g., lithium) in liquid ammonia, to yield the corresponding 11α-hydroxy derivatives; and (l) deketalizing the 11α-hydroxy derivative thus obtained by hydrolysis to give the desired 12α-(lower alkyl)-$\Delta^4$-pregnene-11α,17α,21-triol-3,20-diones. The 12α-(lower alkyl)-$\Delta^4$-pregnene-11α,17α,21-triol-3,20-diones can then be 1-dehydrogenated microbioallly by means of *Bacterium cyclooxydans* by the method disclosed in U.S. Patent No. 2,822,318 to yield the corresponding 12α-(lower alkyl)-$\Delta^{1,4}$-pregnadiene-11α,17α,21-triol-3,20-diones.

These starting materials are physiologically active substances which possess glucocorticoid activity and can be used in place of such known steroids as hydrocortisone in the treatment of rheumatoid arthritis.

The following examples illustrate the preparation of these starting materials:

EXAMPLE D

*12α-Methyl-$\Delta^4$-Pregnene-11α,17α,21-Triol-3,20-Dione*

(1) *Preparation of 2,21 - diethoxyoxalyl - 12α - methyl-11β-hydroxyprogesterone and the sodium dienolate thereof.*—To a solution of 7.2 g. of 12α-methyl-11β-hydroxyprogesterone in 100 ml. of anhydrous tertiary butyl alcohol at 50° is added with stirring 19 ml. of ethyl oxalate and 23.3 ml. of a 2 N methanolic solution of sodium methoxide. On stirring the mixture for 3 hours at room temperature the sodium dienolate of 2,21-diethoxyoxalyl-12α - methyl - 11β - hydroxyprogesterone separates. This material is collected, washed with a little ether and then dissolved in water. The aqueous solution is acidified with dilute hydrochloric acid whereupon 2,21-diethoxyoxalyl - 12α - methyl - 11β - hydroxyprogesterone separates from solution. The material is collected, washed with water and dried in vacuo.

(2) *Preparation of 2 - bromo - 12α - methyl - $\Delta^{4,17(20)}$-pregnadiene-11β-ol-3-one-21-oic acid methyl ester.*—To a stirred mixture of 8.1 g. of 2,21-diethoxyoxalyl-12α-methyl-11β-hydroxyprogesterone and 5.9 g. of anhydrous potassium acetate in 140 ml. of methanol is added at 0°, 10% wt./v. of bromine in methanol over a period of 30 minutes until the bromine is no longer decolorized immediately (about 74 ml. of bromine solution required). 50 mg. of phenol is added and the solution of the 2,21,21-tribromo compound is treated with 67 ml. of 1.5 N methanolic sodium methoxide. The mixture is heated at 80° for 5 minutes, cooled and diluted with iced water. The precipitated 2-bromo compound is collected, washed with water and dried in vacuo.

(3) *Preparation of 12α-methyl-$\Delta^{4,17(20)}$-pregnadiene-11β-ol-3-one-21-oic acid methyl ester.*—A mixture of 5 g. of 2-bromo-12α-methyl-$\Delta^{4,17(20)}$-pregnadiene-11β-ol-3-one-21-oic acid methyl ester and 5 g. of zinc in 100 ml. of benzene, 50 ml. of methanol and 10 ml. of acetic acid is stirred at room temperature for 4 hours. The inorganic material is filtered off and washed with 300 ml. of benzene. The mother liquors from the reaction are diluted with water and extracted with benzene. The combined benzene extracts are washed successively with water, dilute aqueous sodium bicarbonate and water, then dried over sodium sulfate and evaporated to dryness in vacuo. Crystallization from acetone-hexane gives 12α-methyl - $\Delta^{4,17(20)}$ - pregnadiene - 11β - ol - 3 - one - 21-oic acid methyl ester.

(4) *Preparation of 3-pyrrolidino-12α-methyl-$\Delta^{3,5,17(20)}$-pregnatriene-11β-ol-3-one-21-oic acid methyl ester.*—To a refluxing solution of 3 g. of 2-bromo-12α-methyl-$\Delta^{4,17(20)}$-pregnadiene-11β-ol-3-one-21-oic acid methyl ester in 35 ml. of methanol is added 3.5 ml. of pyrrolidine under nitrogen, the solution then being heated for an additional 3 minutes. Crystals of the 3-pyrrolidino derivative separate from solution. These are collected, washed with a little cold methanol and dried in vacuo.

(5) *Preparation of 12α-methyl-$\Delta^{4,17(20)}$-pregnadiene-11β-21-diol-3-one.*—A solution of 2.8 g. of 3-pyrrolidino-12α - methyl - $\Delta^{3,5,17(20)}$-pregnatriene-11β-ol-3-one-21-oic acid methyl ester in 80 ml. of anhydrous tetrahydrofuran is stirred with 2 g. of lithium aluminum hydride for 1 hour at room temperature. The reaction mixture is cooled and the excess reagent is decomposed by the careful addition of methanol. The reaction mixture is then refluxed with an acetate buffer comprising 40 ml. of methanol, 4 ml. of water, 3.2 ml. of acetic acid and 3.2 g. of sodium acetate. Water is added and the steroids are extracted with chloroform, the chloroform extract then being washed with water, dilute aqueous sodium bicarbonate and water. Evaporation of the solvent in vacuo followed by crystallization of the residue from acetone-hexane yields the diol.

(6) *Preparation of 12α-methyl-$\Delta^{4,17(20)}$-pregnadiene-11β,21-diol-3-one 21-acetate.*—A solution of 2 g. of 12α-methyl-$\Delta^{4,17(20)}$-pregnadiene-11β-21-diol-3-one in 10 ml. of pyridine and 2 ml. of acetic anhydride is allowed to stand at room temperature for 15 hours. The mixture is then diluted with iced water and the precipitated solid collected and dried in vacuo. Crystallization from aceton-hexane yields a pure sample of the 21-acetate.

(7) *Preparation of 12α-methylhydrocortisone 21-acetate.*—To a solution of 386 mg. of 12α-methyl-$\Delta^{4,17(20)}$-pregnadiene-11β-21-diol-3-one 21-acetate in 15 ml. of anhydrous tertiary butyl alcohol is added first 322 mg. of phenyliodoacetate in 0.3 ml. of pyridine and then 15 mg. of osmium tetroxide. The mixture is allowed to stand at room temperature for 18 hours in the absence of light. The mixture is then stirred for 2½ hours with 17 ml. of water, 20 ml. of benzene, 1.8 g. of sodium sulfite and 1.8 g. of sodium bicarbonate. The inorganic material is filtered off and washed several times with chloroform. The aqueous mother liquor is extracted with chloroform. The combined chloroform extracts are then washed with water, dried over sodium sulfate and evaporated to dryness in vacuo. Crystallization of the residue from acetone-hexane yields 12α-methylhydrocortisone 21-acetate.

Similarly, by substituting other 12α-(lower alkyl)-11β-hydroxy-progesterones (e.g., 12α-ethyl-11β-hydroxyprogesterone) for the 12α-methyl steroid in Example D1 and following the procedures of Examples D2 through 7 the corresponding 12α-(lower alkyl) intermediates are formed and the corresponding 12α-(lower alkyl) hydrocortisone 21-acetate (e.g., 12α-ethylhydrocortisone 21-acetate) are recovered.

(8) *Preparation of 12α-methylcortisone 21-acetate.*—To a stirred solution of 5 g. of 12α-methylhydrocortisone 21-acetate in 200 ml. of acetone is added chromium trioxide in 0.67 N sulfuric acid (200 mg./ml.) until a permanent brown coloration is obtained (about 5 ml. required). The solution is stirred at room temperature 30 minutes. Methanol is added to destroy the excess chromic acid and then the mixture is concentrated to about half its volume in vacuo. On adding water, the 11-ketone separates from solution. The material is collected, washed with water, dried and crystallized from acetone-hexane.

(9) *Preparation of 12α-methylcortisone.*—To a stirred solution of 4.3 g. of 12α-methylcortisone 21-acetate in 50 ml. of methanol is added under nitrogen, 10.5 ml. of 10% potassium carbonate solution. After stirring for one hour, the mixture is neutralized by the addition of 1.5 ml. of glacial acetic acid. Saline solution is then added to precipitate the 12α-methylcortisone. The solid is collected, washed with water, dried and crystallized from acetone-hexane to give 12α-methylcortisone.

(10) *Preparation of 12α-methyl-Δ⁵-pregnene-17α,21-diol-3,11,20-trione 3,20-bis-ethylene ketal.*—A mixture of 3 g. of 12α-methylcortisone, 150 ml. of benzene, 24 ml. of ethylene glycol and 48.4 mg. of p-toluene sulfonic acid monohydrate is heated under reflux for 24 hours, the water formed during the reaction being removed azeotropically in a suitable separator. The mixture is diluted with 200 ml. of chloroform and washed successively with dilute sodium bicarbonate and water. Evaporation in vacuo followed by crystallization of the residue from methanol yields 12α-methyl-Δ⁵-pregnene-17α,21-diol-3,11,20-trione 3,20-bis-ethylene ketal.

(11) *Preparation of 12α-methyl-Δ⁵-pregnene-11α,17α,21-triol-3,20-dione 3,20-bis-ethylene ketal.*—To a solution of 200 mg. of 12α-methyl-Δ⁵-pregnene-17α,21-diol-3,11,20-trione 3,20-bis-ethylene ketal in 8 ml. of methanol and 50 ml. of liquid ammonia is added over a ten minute period, 160 mg. of finely cut lithium. The solvent is allowed to evaporate off at room temperature (about 2 hours) and the residue is titurated with water. The precipitated material is collected, washed with water and dried in vacuo. Crystallization from acetone-hexane yields 12α-methyl-Δ⁵-pregnene - 11α,17α,21 - triol - 3,20-dione 3,20-bis-ethylene ketal.

(12) *Preparation of 12α-methyl-Δ⁴-pregnene-11α,17α,21-triol-3,20-dione.*—A solution of 100 mg. of 12α-methyl-Δ⁵-pregnene-11α,17α,21-triol-3,20-dione 3,20-bis-ethylene ketal in 20 ml. of methanol and 0.8 ml. of 8% sulfuric acid is refluxed for 40 minutes. On dilution with water, 12α-methyl-Δ⁴-pregnene-11α,17α,21-triol-3,20-dione separates from solution. The steroid is filtered off, washed with water and dried in vacuo.

Similarly, if 12α-ethylhydrocortisone acetate is substituted for the 12α-methylhydrocortisone acetate in the procedure of Example D8 and the procedures of Examples D9 through 12 are followed, the corresponding 12α-ethyl derivative is obtained.

EXAMPLE E

*12α-Methyl-Δ¹,⁴-Pregnadiene-11α,17α,21-Triol-3,20-Dione*

Following the procedure of Example 1 of U.S. Patent No. 2,822,318 but substituting 12α-methyl-Δ⁴-pregnene-11α,17α,21-triol-13,20-dione for the 11α-hydroxyprogesterone, 12α-methyl - Δ¹,⁴ - pregnadiene-11α,17α,21-triol-3,20-dione is obtained.

Similarly, other 12α-(lower alkyl)-Δ⁴-pregnene-11α,17α,21-triol-3,20-diones, such as 12α-ethyl-Δ⁴-pregnene-11α,17α,21-triol-3,20-dione, are converted to their respective 1-dehydro derivatives.

(4) The 12α - (lower alkyl) - 11α,17α - dihydroxyprogesterone and 12α - (lower alkyl) - Δ¹,⁴-pregnadiene-11α,17α-diol-3,20-dione reactants can be prepared by interacting a 21-alkane sulfonic acid ester (e.g., mesyl and ethanesulfonyl) of a 12α-(lower alkyl)hydrocortisone (e.g., 12α-methylhydrocortisone or 12α-ethylhydrocortisone) or 12α-(lower alkyl) prednisolone (e.g., 12α-methyl prednisolone) with an alkali metal iodide (e.g., sodium iodide), preferably at an elevated temperature in an organic solvent for the steriod reactant, thereby yielding the corresponding 21-iodo derivatives [i.e. a 21-iodo-12α-(lower alkyl)-11β-17α-dihydroxyprogesterone and a 21-iodo-12α-(lower alkyl)-Δ¹,⁴-pregnadiene-11β,12α-diol - 3,20-dione]. The 21-iodo compounds thus formed are then treated with an alkali metal bisulfite (e.g. sodium bisulfite) to deiodate the intermediate thereby forming 12α-(lower alkyl)-11β,17α-dihydroxyprogesterones. The 11β-hydroxy steriods thus formed are then oxidized in the usual manner, as by treatment with a hexavalent chromic compound (e.g., chromium trioxide) to yield the corresponding 11-keto derivatives [e.g., a 12α-(lower alkyl)-11-keto-17α-hydroxyprogesterone and a 12α-(lower alkyl)-Δ¹,⁴-pregnadiene-17α-ol-3,11,20-trione]. The 11-keto compounds are then ketalized, as by treatment with a dihydric alcohol (e.g. ethylene glycol) to yield the corresponding 3,20-diketal derivatives, which in turn are reduced, as by treatment with an alkali metal (e.g., lithium) in liquid ammonia, to yield the corresponding 11α-hydroxy derivatives. These 11α-hydroxy steriods can then be hydrolyzed, as by treatment in a suitable solvent such as methanol with a dilute aqueous acid at an elevated temperature, to yield 12α-(lower alkyl)-Δ⁴-pregnene-11α,17α-diol-3,20 - diones and 12α-(lower alkyl)-Δ¹,⁴-pregnadiene-11α,17α - diol-3,20-diones. These starting materials are physiologically active progestational agents which can be used in lieu of such known substances as progesterone in treatment of habitual abortion.

The following examples illustrate the preparation of these starting materials:

EXAMPLE F

*12α-Methyl-Δ⁴-Pregnene-11α,17α-Diol-3,20-Dione*

(1) *Preparation of 12α-methylhydrocortisone.*—To a stirred solution of 304 mg. of 12α-methylhydrocortisone 21-acetate in 18 ml. of methanol is added under nitrogen 3.6 ml. of 10% potassium carbonate solution. After stirring for 30 minutes the reaction mixture is neutralized by the addition of 0.6 ml. of glacial acetic acid. On dilution with saline solution, 12α-methylhydrocortisone separates from solution. The material is filtered off, washed successively with water and a little ice-cold methanol and then dried in vacuo.

(2) *Preparation of 12α-methylhydrocortisone 21-mesylate.*—To a solution of 174 mg. of 12α-methylhydrocortisone in 4 ml. of anhydrous pyridine is added, at 0°, 0.15 ml. of methane sulfonyl chloride in 1 ml. of chloroform. The reaction is left for three hours at 0°. Dilution with iced water precipitates 12α-methylhydrocortisone 21-mesylate.

(3) *Preparation of 21-iodo-12α-methyl-11β,17α-dihydroxyprogesterone.*—A mixture of 200 mg. of 12α-methylhydrocortisone 21-mesylate and 500 mg. of sodium iodide in 10 ml. of acetone is heated under reflux for 15 minutes. The reaction mixture is then diluted with water, the precipitated solid collected, washed with water and dried in vacuo. Crystallization from acetone-hexane yields a pure sample of the 21α-iodo compound.

(4) *Preparation of 12α-methyl-11β,17α-dihydroxyprogesterone.*—To a solution of 127 mg. of 21-iodo-12α-methyl-11β,17α-dihydroxyprogesterone in 1.5 ml. of dioxane is added at 80° 1.5 ml. of 5% aqueous sodium bisulfite, the reaction mixture then being heated for 30 minutes. The solution is cooled, water added and the steroids extracted with chloroform. The chloroform extract is washed with water, dried over sodium sulfate and evaporated to dryness in vacuo. Crystallization from acetonehexane yields a sample of 12α-methyl-4-pregnene-11β,17α-diol-3,20-dione.

Similarly, by substituting other 12α-(lower alkyl)hydrocortisone 21-acetates (e.g., 12α-ethylhydrocortisone 21-acetate) for the 12α-methyl steriod in Example F1 and following the procedures of F2 through 4, the corresponding 21-iodo-12α-(lower alkyl) intermediates are formed and the corresponding 12α-(lower alkyl)-11β,17α-dihydroxyprogesterones (e.g., 12α-ethyl-11β,17α-dihydroxyprogesterone) are recovered as the final products.

(5) *Preparation of 12α-methyl-11-keto-17α-hydroxyprogesterone.*—To a stirred solution of 5 g. of 12α-methyl-11β,17α-dihydroxyprogesterone in 200 ml. of acetone is added chromium trioxide in 0.67 N sulfuric acid (200 mg./ml.) until a permanent brown coloration is obtained (about 5 ml. required). The solution is stirred at room temperature 30 minutes. Methanol is added to destroy the excess chromic acid and then the mixture is concentrated to about half its volume in vacuo. On adding water, the 11-ketone separates from solution. The material is collected, washed with water, dried and crystallized from acetone-hexane.

(6) *Preparation of 12α-methyl - Δ⁵ - pregnene-17α-ol-3,11,20-trione 3,20-bis-ethylene ketal.*—A mixture of 3 g. of 12α-methyl-11-keto-17α-hydroxyprogesterone, 150 ml. of benzene, 24 ml. of ethylene glycol and 48.4 mg. of p-toluene sulfonic acid monohydrate is heated under reflux for 24 hours, the water formed during the reaction being removed azeotropically in a suitable separator. The mixture is diluted with 200 ml. of chloroform and washed successively with dilute sodium bicarbonate and water. Evaporation in vacuo followed by crystallization of the residue from methanol yields 12α-methyl-Δ⁵-pregnene-17α-ol-3,11,20-trione 3,20-bis-ethylene ketal.

(7) *Preparation of 12α-methyl-Δ⁵-pregnene-11α,17α-diol-3,20-dione 3,20-bis-ethylene ketal.*—To a solution of 200 mg. of 12α-methyl-Δ⁵-pregnene-17α-diol-3,11,20-trione 3,20-bis-ethylene ketal in 8 ml. of methanol and 50 ml. of liquid ammonia is added over a ten minute period, 160 mg. of finely cut lithium. The solvent is allowed to evaporate off at room temperature (about 2 hours) and the residue is triturated with water. The precipitated material is collected, washed with water and dried in vacuo. Crystallization from acetone-hexane yields 12α-methyl-Δ⁵-pregnene-11α,17α-diol-3,20-dione 3,20-bis-ethylene ketal.

(8) *Preparation of 12α-methyl-Δ⁴-pregnene-11α,17α-diol-3,20-dione.*—A solution of 100 mg. of 12α-methyl-Δ⁵-pregnene-11α,17α-diol-3,20-dione 3,20-bis-ethylene ketal in 20 ml. of methanol and 0.8 ml. of 8% sulfuric acid is refluxed for 40 minutes. On dilution with water, 12α-methyl-Δ⁴-pregnene-11α,17α - diol - 3,20 - dione separates from solution. The steroid is filtered off, washed with water and dried in vacuo.

Similarly, if 12α-ethyl-11β,17α-dihydroxyprogesterone is substituted for the 12α-methyl-11β,17α-dihydroxyprogesterone in the procedure of Example F5 and the procedures of Example F6 through 8 are followed, the corresponding 12α-ethyl derivatives are obtained respectively.

EXAMPLE G

*12α-Methyl-Δ¹,⁴-Pregnadiene-11α,17α-Diol-3,20-Dione*

(1) *Preparation of 12α-methylprednisolone.*—Following the procedure of Example 1 of U.S. Patent No. 2,822,318 but substituting 12α-methylhydrocortisone for the 11α-hydroxyprogesterone, 12α-methylprednisolone is obtained.

Similarly, other 12α-(lower alkyl)hydrocortisones, such as 12α-ethylhydrocortisone are converted to their respective 1-dehydro derivatives.

(2) *Preparation of 12α-methyl-Δ¹,⁴-pregnadiene-11α,17α-diol-3,20-dione.*—Following the procedure of Example F2 through 8, but substituting 12α-methylprednisolone for the 12α-methylhydrocortisone in the procedure of Example F2, 12α-methyl-Δ¹,⁴-pregnadiene-11α,17α-diol-3,20-dione is obtained.

Similarly, other 12α-(lower alkyl) prednisolones, such as 12α-ethylprednisolone are converted to their corresponding - (lower alkyl)-Δ¹,⁴-pregnadiene-11α,17α-diol-3,20-dione derivatives.

The intermediate 11α-lower alkane (or monocyclic hydrocarbon aromatic) sulfonyloxy derivatives are then treated with a salt of a strong base and weak acid (e.g. sodium acetate) in the presence of a weak acid (e.g., acetic acid) whereby the alkane (or monocyclic hydrocarbon aromatic) sulfonic acid is split off to give the desired 12-alkylidene final products. If a 21-ester is employed as the starting material and a free 21-hydroxyl compound is desired, the steroid may be hydrolyzed in the usual manner to yield a free 21-hydroxyl steroid.

The 12-alkylidene steroids of this invention are physiologically active substances which possess progestational activity. Hence, these steroids can be used in lieu of known progestational steriods, such as progesterone in the treatment of habitual abortion, being formulated for such administration in the same type of parenteral preparations as progesterone, for example, with concentration and/or dosage based on the activity of the particular compound.

The following examples are illustrative of the invention (all temperatures being in centigrade):

EXAMPLE 1

*12α-Methyl-11α-Hydroxyprogesterone 11α-Mesylate*

A solution of 1.4 g. of 12α-methyl-11α-hydroxyprogesterone in 10 ml. of pyridine and 0.5 ml. of mesyl chloride is kept at 0° for 16 hours. The solution is then diluted with iced water, the precipitated solid collected, washed well with water to give about 1.7 g. of the 11α-mesylate. Crystallization of a sample from acetone-hexane furnishes an analytical sample having M.P. 172–174° (dec.); $[\alpha]_D$ +141° (c. 0.93 in $CHCl_3$);

$\lambda_{max.}^{Eto}$ 238 m$\mu$ (14,500); $\lambda_{max.}^{Nujol}$ 5.91, 5.98, 6.22, 7.52$\mu$.

*Analysis.*—Calcd. for $C_{23}H_{34}O_5S$ (422.56): S, 7.59. Found: S, 7.13.

Similarly, the 11α-mesylates of 12α-ethyl-11α-hydroxyprogesterone and 12α-methyl-Δ¹,⁴-pregnadiene-11α-ol-3,20-dione can be prepared. Furthermore if another lower alkane sulfonyl chloride, such as ethane sulfonyl chloride, or a monocyclic hydrocarbon aromatic sulfonyl chloride such as tosyl chloride is substituted for the mesyl chloride in the procedure of Example 1, the corresponding 11α-lower alkane or 11α-monocyclic hydrocarbon aromatic sulfonyloxy derivative is obtained.

EXAMPLE 2

*12-Methyleneprogesterone*

A solution of 1.58 g. of 12α-methyl-11α-hydroxyprogesterone 11α-mesylate in 16 ml. of glacial acetic acid is heated under reflux with 1.6 g. of anhydrous sodium acetate for one hour. The mixture is diluted with water, and the steroids extracted with chloroform. The chloroform is washed several times with water, dried over sodium sulfate and the solvent removed in vacuo. The residue is taken up in 10 ml. of hexane-benzene (1:1) and absorbed on 30 g. of acid-washed alumina. Elution with benzene (900 ml.) and with chloroform-benzene (1:9) (400 ml.) followed by crystallization from acetone-hexane yields about 460 mg. of 12-methyleneprogesterone, M.P. 135–138°; $[\alpha]_D$ +168° (c. 1.19 in $CHCl_3$);

$\lambda_{max.}^{Etoh}$ 240 m$\mu$ (17,200); $\lambda_{max.}^{Nujol}$ 5.86, 6.00, 6.19$\mu$

*Analysis.*—Calcd. for $C_{22}H_{30}O_2$ (326.46); C, 80.93; H, 9.26. Found: C, 81.34; H, 9.22.

Similarly, the 11α-mesylates of 12α-ethyl-11α-hydroxyprogesterone and 12α-methyl-Δ¹,⁴-pregnadiene-11α-ol-3,20-dione can be converted to 12-ethylideneprogesterone and 12-methylene-Δ¹,⁴-pregnadiene 3,20-dione, respectively.

EXAMPLE 3

*12-Methylene-17α-Hydroxyprogesterone*

Following the procedures of Examples 1 and 2 but substituting 1.6 g. of 12α-methyl-11α,17α-dihydroxyprogesterone for the 12α-methyl-11α-hydroxyprogesterone in the procedure of Example 1, there is obtained 12α-methyl-11α,17α-dihydroxyprogesterone 11α-mesylate and 12-methylene-Δ⁴-pregnene-17α-ol-3,20-dione, respectively.

EXAMPLE 4

*12-Methyl-Δ⁴-Pregnene-11α,21-Diol-3,20-Dione 11α-Mesylate 21-Acetate*

(a) *Preparation of 12α-methyl - Δ⁴ - pregnene-11α,21-diol-3,20-dione 21-monoacetate.*—A solution of 720 mg. of 12α-methyl-Δ⁴-pregnene-11α,21-diol-3,20-dione in 10 ml. of pyridine and 220 mg. of acetic anhydride is kept at 0° for six hours. The solution is then concentrated in vacuo, the residue taken up in chloroform, and the solution extracted with dilute sulfuric acid, dilute bicarbonate and water. Evaporation of the solvent in vacuo leaves the monoacetate as a syrup, which is used in step *b* without further purification.

(*b*) *Preparation of 12α-methyl - Δ⁴ - pregnene-11α,21-diol-3,20-dione 11α-mesylate 21-acetate.*—To a solution of 804 mg. of 12α-methyl-Δ⁴-pregnene-11α,21-diol-3,20-dione 21-monoacetate in 10 ml. of anhydrous pyridine is added at 0°, 0.4 ml. of methanesulfonyl chloride. The mixture is allowed to remain at 0° for 18 hours. Ice is then added and the mixture extracted with chloroform. The chloroform extract is washed with dilute sulfuric acid, water, dilute bicarbonate and again with water, dried, and then evaporated to dryness in vacuo. The residue on crystallization from methanol gives the pure mesylate.

Similarly, by substituting the anhydrides or acid chlorides of other acids in step *a* of Example 4, the corresponding 21-esters are formed. In this reaction the preferred acid anhydrides and acyl chlorides are those of hydrocarbon carboxylic acids having less than ten carbon atoms, as exemplified by the lower alkanoic acids (e.g., acetic, propionic and enanthic acid), the monocyclic aromatic carboxylic acids (e.g., benzoic and toluic acid), the monocyclic aralkanoic acids (e.g., phenacetic and β-phenylpropionic acid), the lower alkenoic acids, the cycloalkane carboxylic acids, and the cycloalkene carboxylic acids.

EXAMPLE 5

*12-Methylene-Δ⁴-Pregnene-21-Ol-3,20-Dione 21-Acetate*

A solution of 500 mg. of 12α-methyl-Δ⁴-pregnene-11α,21-diol-3,20-dione 11α-mesylate 21-acetate in 10 ml. of glacial acetic acid is heated under reflux with 1.0 g. of anhydrous sodium acetate for one hour. The mixture is diluted with water, and the steroids extracted with chloroform. The chloroform extract is washed several times with water, dried over sodium sulfate and the solvent removed in vacuo. Crystallization of the resulting residue from acetone-hexane yields pure 12-methylene-Δ⁴-pregnene-21-ol-3,20-dione 21-acetate.

EXAMPLE 6

*12-Methylene-Δ⁴-Pregnene-21-Ol-3,20-Dione*

To a solution of 100 mg. of 12-methylene-Δ⁴-pregnene-21-ol-3,20-dione 21-acetate in 12 ml. of methanol is added under nitrogen 0.207 ml. of an oxygen-free 10% aqueous solution of potassium carbonate. After 30 minutes at room temperature the mixture is neutralized with acetic acid and taken up in chloroform and water. The chloroform extract is dried over sodium sulfate and after evaporation in vacuo leaves 12-methylene-Δ⁴-pregnene-21-ol-3,20-dione, which is recrystallized from acetone-hexane.

Similarly, if 12α-methyl-Δ¹,⁴-pregnadiene-11α,21-diol-3,20-dione is substituted for the 12α-methyl-Δ⁴-pregnene-11α,21-diol-3,20-dione in the procedure of Example 4 and the procedures of Examples 4, 5 and 6 are followed, 12α-methyl-Δ¹,⁴-pregnadiene-11α,21-diol-3,20-dione 21-acetate, 12α - methyl-Δ¹,⁴-pregnadiene-11α,21-diol-3,20-dione 11α-mesylate 21-acetate, 12α-methylene-Δ¹,⁴-pregnadiene-21-ol-3,20-dione 21-acetate, and 12-methylene-Δ¹,⁴-pregnadiene-21-ol-3,20-dione are formed, respectively. Furthermore, if other 12α-(lower alkyl) steroid derivatives are substituted for the 12α-methyl steroid in Example 4, the corresponding 12α-(lower alkyl) steroids are formed.

EXAMPLE 7

*12-Methylene-Δ⁴-Pregnene-17α,21-Diol-3,20-Dione*

Following the procedures of Examples 4, 5 and 6, but substituting 12α-methyl-Δ⁴-pregnene-11α,17α,21-triol-3,20-dione for the 12α-methyl-Δ⁴-pregnene-11α,21-diol-3,20-dione in the procedure of Example 4, 12α-methyl-Δ⁴-pregnene - 11α,17α,21-triol-3,20-dione 21-acetate, 12α-methyl-Δ⁴-pregnene-11α,17α,21-triol-3,20-dione 11α - mesylate 21-acetate, 12-methylene-Δ⁴-pregnene-17α-21-diol-3,20-dione 21-acetate, and 12-methylene-Δ⁴-pregnene-17α-21-diol-3,20-dione are formed, respectively. Similarly, other 12α-(lower alkyl) starting materials yield the corresponding 12-(lower alkylidene)derivatives.

The invention may be variously otherwise embodied within the scope of the appended claims.

What is claimed is:

1. A compound selected from the group consisting of a steroid of the general formula

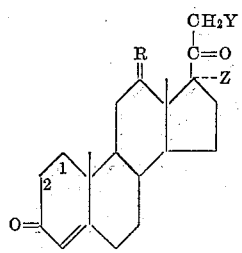

and the 1,2-position unsaturate thereof, wherein R is lower alkylidene, Y is selected from the group consisting of hydrogen, hydroxy, and the acyloxy radical of a hydrocarbon carboxylic acid of less than ten carbon atoms, and Z is selected from the group consisting of hydrogen and hydroxy.

2. 12-methylene progesterone.

3. 12-methylene-Δ⁴-pregnene-17α-ol-3,20-dione.

4. The 21-ester of 12-methylene-Δ⁴-pregnene-3,20-dione-21-ol with a hydrocarbon carboxylic acid of less than ten carbon atoms.

5. The 21-ester of 12-methylene-Δ⁴-pregnene-17α-21-diol-3,20-dione with a hydrocarbon carboxylic acid of less than ten carbon atoms.

6. A compound selected from the group consisting of a steroid of the general formula

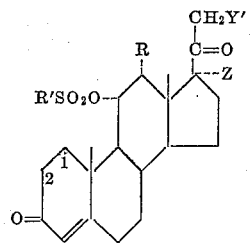

and the 1,2-position unsaturate thereof, wherein R is lower alkyl, R' is selected from the group consisting of lower alkyl and monocyclic hydrocarbon aromatic, Y' is selected from the group consisting of hydrogen and the acyloxy radical of a hydrocarbon carboxylic acid of less than ten carbon atoms, and Z is selected from the group consisting of hydrogen and hydroxy.

7. 12α-methyl-11α-hydroxyprogesterone 11α-mesylate.

8. A process for the preparation of a compound selected from the group consisting of a steroid of the general formula:

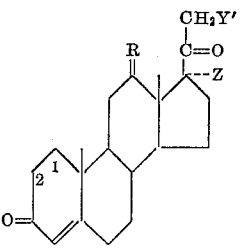

and the 1,2-position unsaturate thereof, wherein R is lower alkylidene, Y' is selected from the group consisting of hydrogen and the acyloxy radical of a hydrocarbon carboxylic acid of less than ten carbon atoms, and Z is selected from the group consisting of hydrogen and hydroxy, which comprises interacting a compound selected from the group consisting of corresponding steroids of the formula

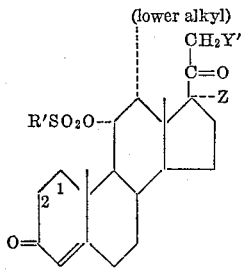

and the 1,2-position unsaturate thereof, wherein R' is selected from the group consisting of lower alkyl and monocyclic aryl and Z and Y' are as defined, with an alkali metal salt of a weak organic acid in the presence of an excess of said acid and separating the product thus formed.

9. The process of claim 8 wherein the steroid reactant is 12α-methyl-11α-hydroxyprogesterone 11α-mesylate.

10. The process of claim 8 wherein the steroid reactant is 12α-methyl-11α,17α-dihydroxyprogesterone 11α-mesylate.

11. The process of claim 8 wherein the steroid reactant is 12α-methyl - Δ⁴ - pregnene-11α,21-diol-3,20-dione 11α-mesylate 21-acetate.

12. The process of claim 8 wherein the steroid reactant is 12α-methyl - Δ⁴ - pregnene-11α,17α,21-triol-3,20-dione 11α-mesylate 21-acetate.

13. The process of claim 8 wherein an alkali metal acetate and acetic acid are employed in the reaction.

References Cited in the file of this patent
UNITED STATES PATENTS

| | | |
|---|---|---|
| 2,751,397 | Nathan et al. | June 19, 1956 |
| 2,891,076 | Fried | June 16, 1959 |